(12) United States Patent
Mündermann et al.

(10) Patent No.: US 7,804,998 B2
(45) Date of Patent: Sep. 28, 2010

(54) MARKERLESS MOTION CAPTURE SYSTEM

(75) Inventors: Lars Mündermann, Mountain View, CA (US); Stefano Corazza, San Francisco, CA (US); Thomas P. Andriacchi, Los Altos Hills, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 820 days.

(21) Appl. No.: 11/716,130

(22) Filed: Mar. 9, 2007

(65) Prior Publication Data

US 2008/0031512 A1 Feb. 7, 2008

Related U.S. Application Data

(60) Provisional application No. 60/781,253, filed on Mar. 9, 2006.

(51) Int. Cl.
 *G06K 9/00* (2006.01)
(52) U.S. Cl. ................... 382/154; 382/156; 382/158; 382/159; 382/160; 606/87; 606/90
(58) Field of Classification Search ............... 382/154, 382/156, 158, 159, 160; 606/87, 90
See application file for complete search history.

(56) References Cited

U.S. PATENT DOCUMENTS

2005/0119661 A1 * 6/2005 Hodgson et al. ............. 606/90

OTHER PUBLICATIONS

Cheung, German K.M "Shape-From-Silhouette of Articulated Objects and its Use for Human Body Kinematics Estimation and Motion Capture" Part 1 (2005) Int. J. of Computer Vision vol. 62(3) pp. 221-247.
Cheung, German K.M "Shape-From-Silhouette Across Time Part II: Applications to Human Modeling and Markerless Motion Tracking" (2005) Intl. J. of Computer Vision vol. 63(3) pp. 225-245.

* cited by examiner

*Primary Examiner*—Matthew C Bella
*Assistant Examiner*—Mike Rahmjoo
(74) *Attorney, Agent, or Firm*—Lumen Patent Firm

(57) ABSTRACT

A markerless motion capture system is provided for measurements accurate enough for biomechanical, clinical, sport, entertainment, animation, game and movie, design, ergonomics, surveillance applications. The system has multiple cameras distributed around a viewing volume. The cameras allow for the creation of three-dimensional mesh representations of an object dynamically moving within the viewing volume. A model of the object that incorporates specific morphological and kinematic model information (including soft joint constraints) is then matched to the captured three-dimensional mesh representations. The matching routine aims to embed the model into each of the three-dimensional representations using (i) iterative closest point or simulated annealing algorithms and (ii) using soft joint constraints. This unique combination of routines offers a simple, time-efficient, accurate and thus more meaningful assessment of movements. The system further offers feasibility of accurately and precisely measuring three-dimensional kinematics of the dynamically moving object or human.

24 Claims, 7 Drawing Sheets

MARKERLESS MOTION CAPTURE SYSTEM

CROSS-REFERENCE TO RELATED APPLICATIONS

This application is cross-referenced to and claims priority from U.S. Provisional Application 60/781,253 filed Mar. 9, 2006, which is hereby incorporated by reference.

FEDERALLY-SPONSORED RESEARCH OR DEVELOPMENT

This invention was made with Government support under contract 0325715 awarded by the National Science Foundation. The Government has certain rights in this invention.

FIELD OF THE INVENTION

The invention relates to motion capture systems. In particular, the invention relates to unencumbered (markerless also referred to as marker-free) motion capture systems using multiple cameras.

BACKGROUND OF THE INVENTION

The development of markerless motion capture systems is motivated by the need to address contemporary needs to understand normal and pathological human movement without the encumbrance of markers or fixtures placed on the subject, while achieving the quantitative accuracy of marker based systems. To date, markerless methods are not widely available because the accurate capture of human movement without markers is technically challenging. Biomechanical, medical, sports and animation applications of markerless capture have been limited by the lack of both accuracy and robustness of such methods.

Previous work has demonstrated that minor changes in patterns of locomotion can have a profound impact on the outcome of treatment or progression of musculoskeletal pathology. Therefore the ability to address emerging clinical questions on problems that influence normal patterns of locomotion requires new methods that would limit the risk of producing artifact due to markers or the constraints of the testing methods. For example, the constraints of the laboratory environment as well as the markers placed on the subjects can mask subtle but important changes to the patterns of locomotion. It has been shown that the mechanics of walking was changed in patients with anterior cruciate ligament deficiency of the knee; functional loading influenced the outcome of high tibial osteotomy; functional performance of patients with total knee replacement was influenced by the design of the implant, and the mechanics of walking influenced the disease severity of osteoarthritis of the knee.

Each of these clinical examples is associated with subtle though important changes to the mechanics of walking, which indicates several necessary requirements for the next significant advancement in the understanding of normal and pathological human movement. The present invention addresses these needs and advances the art of markerless motion capture and the applications thereof. In addition, the advancements introduced by the present invention will also facilitate applications in other fields such as: i) sports by allowing for example the assessment of athletes' motion/performances in their natural environment, ii) entertainment, gaming and animation by utilizing for example markerless motion captured data for rendering engines and/or for navigation in user interfaces, or iii) surveillance by allowing for example the identification of a unique motion-signature for individuals.

SUMMARY OF THE INVENTION

The markerless motion capture described herein is able to achieve a level of accuracy that enables the capture and analysis of normal and pathological human movement. The system includes several method steps or routines, which in one embodiment are implemented as a computer-readable storage medium that contains a set of instructions executable on a computer.

First, a static full-body model R of a single subject is defined. Model R is a three-dimensional articulated multi-segment model that is defined by polygon meshes for body segments and joint center locations between adjacent body segments. Up to 6 degrees of freedom (DOF) in articulation can be provided at each joint. A three-dimensional representation of the single subject moving within the volume is captured by a markerless motion capture system with multiple cameras. In one embodiment, for each of the markerless-motion-captured frames a three-dimensional full-body mesh C of the same single subject is defined. Then the full-body mesh C of each of the markerless-motion-captured frames is matched at the mesh-level with the full-body model R using soft joint constraints. The results output a full-body three-dimensional model of the single subject for the movement within the volume for each of the markerless-motion-captured frames. The resulting full-body three-dimensional model is a three-dimensional articulated multi-segment model providing up to 6 DOF in articulation at each joint. The model results can be viewed, manipulated and presented using computer systems and displays and the Internet.

Instead of using the three-dimensional polygon mesh C, in other embodiments of the invention, one could use model C as a three-dimensional points cloud, a set of silhouettes or features characterizing the human body moving within said viewing volume.

The soft joint constraints approach in this invention compensates for inaccuracies in the kinematic chain of model R and in the definition of mesh C or model C. As a result a more anatomically correct matching is obtained. A typical range for deviations of joint centers between neighboring segments is at least 0.1 mm or more.

Initialization of the first frame in the matching could be accomplished using (i) a stochastic optimization method, (ii) a gradient descent method, (iii) alignment of model C and model R based on orientation and centers of mass, and/or (iv) model R and model C inertia tensors. The matching is based on evolutions of an iterative process of iterative closet point (ICP) or simulated annealing (SA) methods.

The three-dimensional full-body model R and mesh C are defined by a homogenous distribution of points of the respective meshes. Furthermore, each body segment of model R has it own three-dimensional local reference frame and has a global three-dimensional reference frame within the volume or the environment. The local reference frames defined on the full-body model R are used to provide up to 6 DOF in articulation at each joint.

BRIEF DESCRIPTION OF THE FIGURES

The present invention together with its objectives and advantages will be understood by reading the following description in conjunction with the drawings, in which.

DETAILED DESCRIPTION OF THE INVENTION

Figure 1:
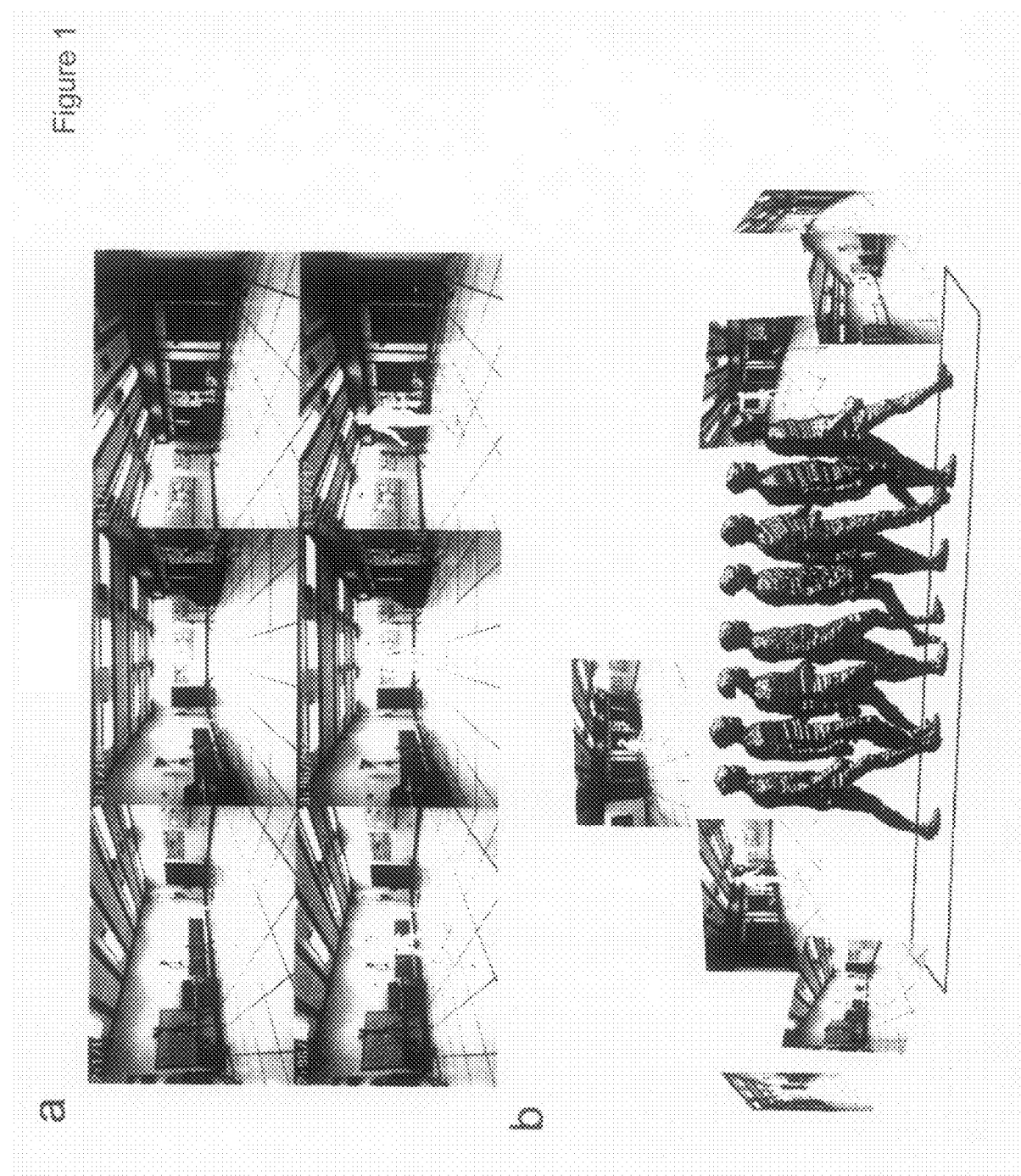
FIG. 1 shows according to the present invention (a) selected background images (top) and separated subject data (bottom), and (b) camera configuration, video sequences with separated subject data, and selected visual hulls (mesh C).

The invention provides a markerless motion capture system using multiple optical sensors that will efficiently and accurately provide three-dimensional (3D) measurements of human movement for applications related to human movement such as, biomechanics, clinical diagnostics, rehabilitation, ergonomics, game and movie industry, entertainment, surveillance, design, and the like.

In one embodiment, the approach employs an articulated iterative closest point (ICP) algorithm with soft joint constraints for tracking human body segments in visual hull sequences (a 3D representation of dynamic sequences from multiple images) referred to as meshes C. Using soft joint constraints small movements at the joint are allowed and penalized in least-squares terms. As a result a more anatomically correct matching suitable for numerous applications is obtained with an objective function that can be optimized in an efficient and straightforward manner.

The articulated ICP algorithm is a generalization of the standard ICP algorithm to articulated models (Besl et al. (1992) in a paper entitled "A method for registration of 3-D shapes" and published in *IEEE Trans. Pattern Anal. Machine Intell.* 14:239-256). The objective is to track a sequence of visual hulls (mesh C) using an articulated model R. The articulated model R is represented as a discrete sampling of points $p_1, \ldots, p_P$ on the surface, a set of rigid segments $s_1, \ldots, s_S$, and a set of joints $q_1, \ldots, q_Q$ connecting the segments. Each visual hull is represented as a set of points $V=v_1, \ldots v_N$, which describes the appearance of the person at that time and constitutes the mesh C. For each frame of the sequence, a set of transformations T is computed, which brings the surfaces of model R and mesh C into correspondence, while respecting the model joints q. T includes a set of rigid transformations $T_j$, one for each rigid part $s_j$. Similar to ICP, this algorithm iterates between two steps. In the first step, each point $p_i$ on the model is associated to its nearest neighbor $v_{s(i)}$ among the visual hull points V, where s(i) defines the mapping from the index of a surface point $p_i$ to its rigid part index. In the second step, given a set of corresponding pairs $(p_i, v_{s(i)})$, a set of transformations T is computed, which brings them into alignment. The second step is defined by an objective function of the transformation variables given as F(T)=H(T)+G(T). The term H(T) ensures that corresponding points (found in the first step) are aligned.

$$H(r, t) = w_H \sum_{i=1}^{P} \|R(r_{s(i)})p_i + t_{s(i)} - v_i\|^2 \tag{1}$$

The transformation $T_j$ of each rigid part $s_j$ is parameterized by a 3×1 translation vector $t_j$ and a 3×1 twist coordinates vector $r_j$ (twists are standard representations of rotation), and $R(r_{s(i)})$ denotes the rotation matrix induced by the twist parameters $r_{s(i)}$. The term G(T) ensures that joints are approximately preserved, where each joint $q_{i,j}$ can be viewed as a point belonging to parts $s_i$ and $s_j$ simultaneously. The transformations $T_i$ and $T_j$ are forced to predict the joint consistently.

$$G(r, t) = w_G \sum_{(i,j) \in Q(M)} \|R(r_i)q_{i,j} + t_i - R(r_j)q_{i,j} - t_j\|^2 \tag{2}$$

Decreasing the value of $w_G$ allows greater movement at the joint, which potentially improves the matching of body segments to the visual hull. The center of the predicted joint locations (belonging to adjacent segments) provides an accurate approximation of the functional joint center. As a result, the underlying kinematic model can be refined and a more anatomically correct matching is obtained.

The proposed invention was validated in an experimental environment. Full body movement was captured using a marker-based and a markerless motion capture system simultaneously.

The marker-based system includes an eight-Qualisys camera optoelectronic system monitoring 3D marker positions for the hip, knees and ankles at 120 fps. The markerless motion capture system includes eight Basler CCD color cameras (656×494 pixels; 80-degree horizontal view) synchronously capturing images at 75 fps. Internal and external camera parameters and a common global frame of reference were obtained through offline calibration. Images from all cameras were streamed in their uncompressed form to several computers during acquisition.

Figure 2:
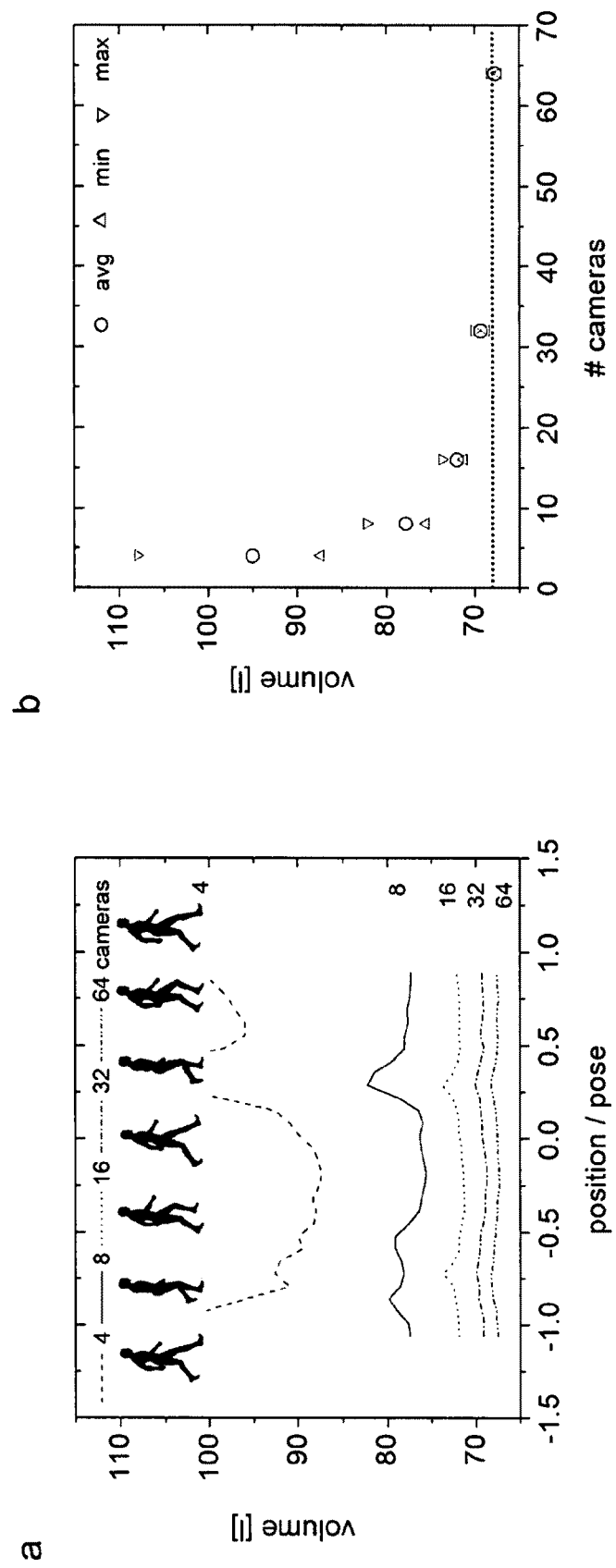
FIG. 2 shows according to the present invention (a) volume values of visual hulls (mesh C) as a function of position and pose in the viewing volume, and (b) average, min and max volume values across the viewing volume as a function of number of cameras. The dotted line in (b) indicates the human form's volume.

The subject was separated from the background in the image sequence of all cameras using intensity and color thresholding compared to background images (see FIG. 1). The 3D representation was achieved through visual hull construction from multiple 2D camera views. Visual hulls were created with voxel edges of $\lambda=10$ mm, which is sufficiently small enough for these camera configurations. The number of cameras used for visual hull construction greatly affects the accuracy of visual hulls. The accuracy of visual hulls also depends on the human subject's position and pose within an observed viewing volume. Simultaneous changes in position and pose result in decreased accuracy of visual hull construction (see FIG. 2). Increasing the number of cameras leads to decreased variations across the viewing volume and a better approximation of the true volume value.

Figure 3:
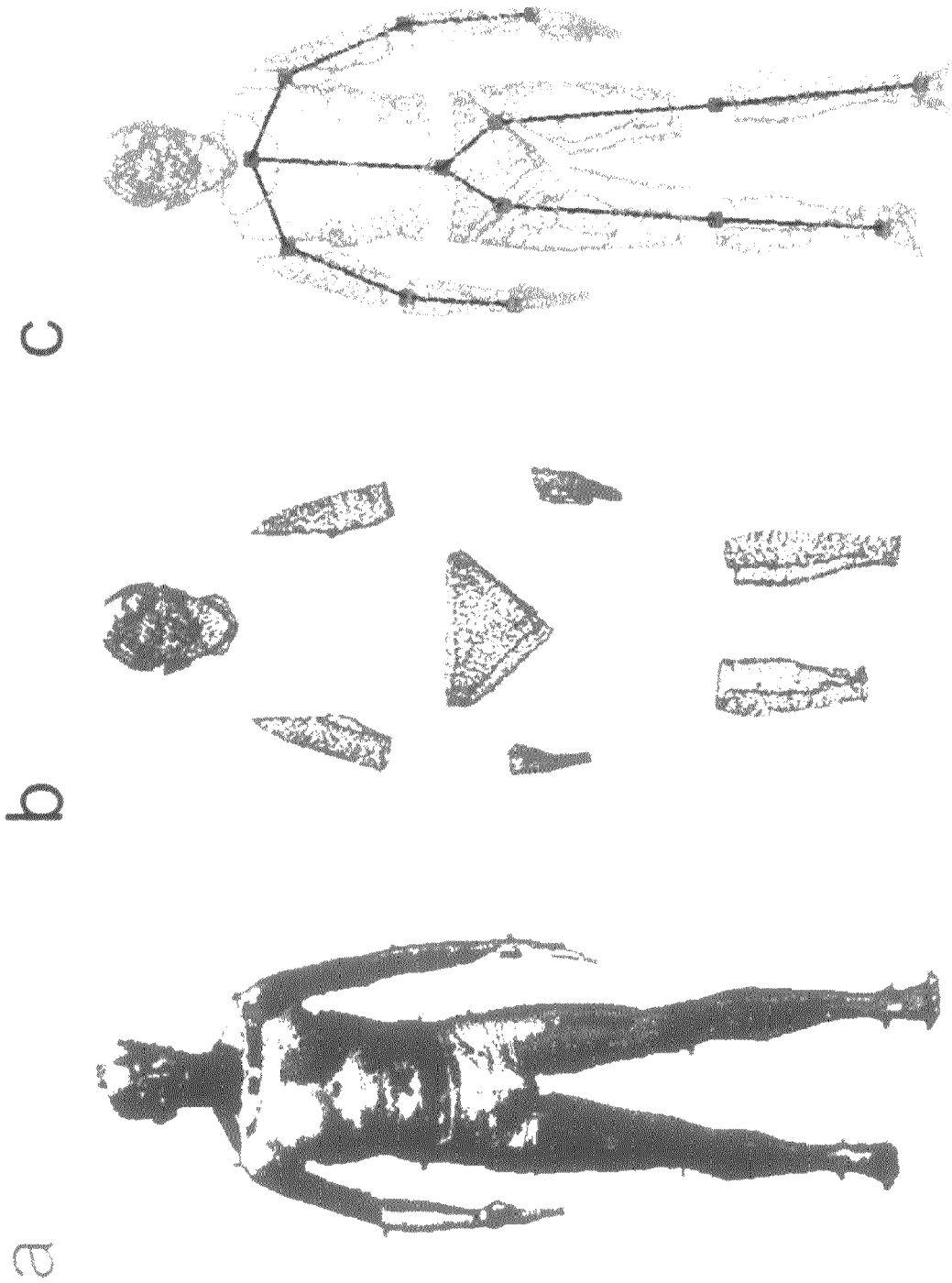
FIG. 3 shows according to the present invention an example of generating model R (a) mesh of a subject, (b) meshes for body segments, and (c) model R includes joint center locations and meshes for body segments.

A subject-specific 3D articulated model R is used to track the 3D representations constructed from the image sequences (mesh C). An articulated model R is typically derived from a morphological description of the human body's anatomy plus a set of information regarding the kinematic chain and joint centers. The morphological information of the human body can be a general approximation (cylinders, super-quadrics, etc.) or an estimation of the actual subject's outer surface. Ideally, an articulated model is subject-specific and created from a direct measurement of the subject's outer surface. The kinematic chain underneath the anatomical segments can be manually set or estimated through either functional or anthropometric methods. The more complex the kinematic description of the body the more information can be obtained from the 3D representation matched by the model. An optimal subject-specific articulated body can be created from a detailed full body laser scan with markers affixed to the subject's joints that were defined through manual palpation. A repository of subject-specific articulated models spanning a wide variety of people has been created allowing choosing a model R that would match a subject based on anthropometric parameter such as height, mass, and volume. An articulated model created from a detailed full-body laser scan with markers affixed to the subject's joints is shown in FIG. 3. In the exemplary embodiment the articulated model R included 15 body segments (head, trunk, pelvis, and left and right arm, forearm, hand, thigh, shank and foot) and 14 joints connecting these segments. While in marker-based systems the anatomic reference frame of a segment is acquired from anatomical landmarks tracked consistently through the motion path, in the markerless system the anatomical reference frames are defined by the model joint centers and reference pose. During the tracking process, the reference frames remain rigidly attached to their appropriate model anatomic segment, thus describing the estimated position and orientation in the subject's anatomic segments.

Figure 4:
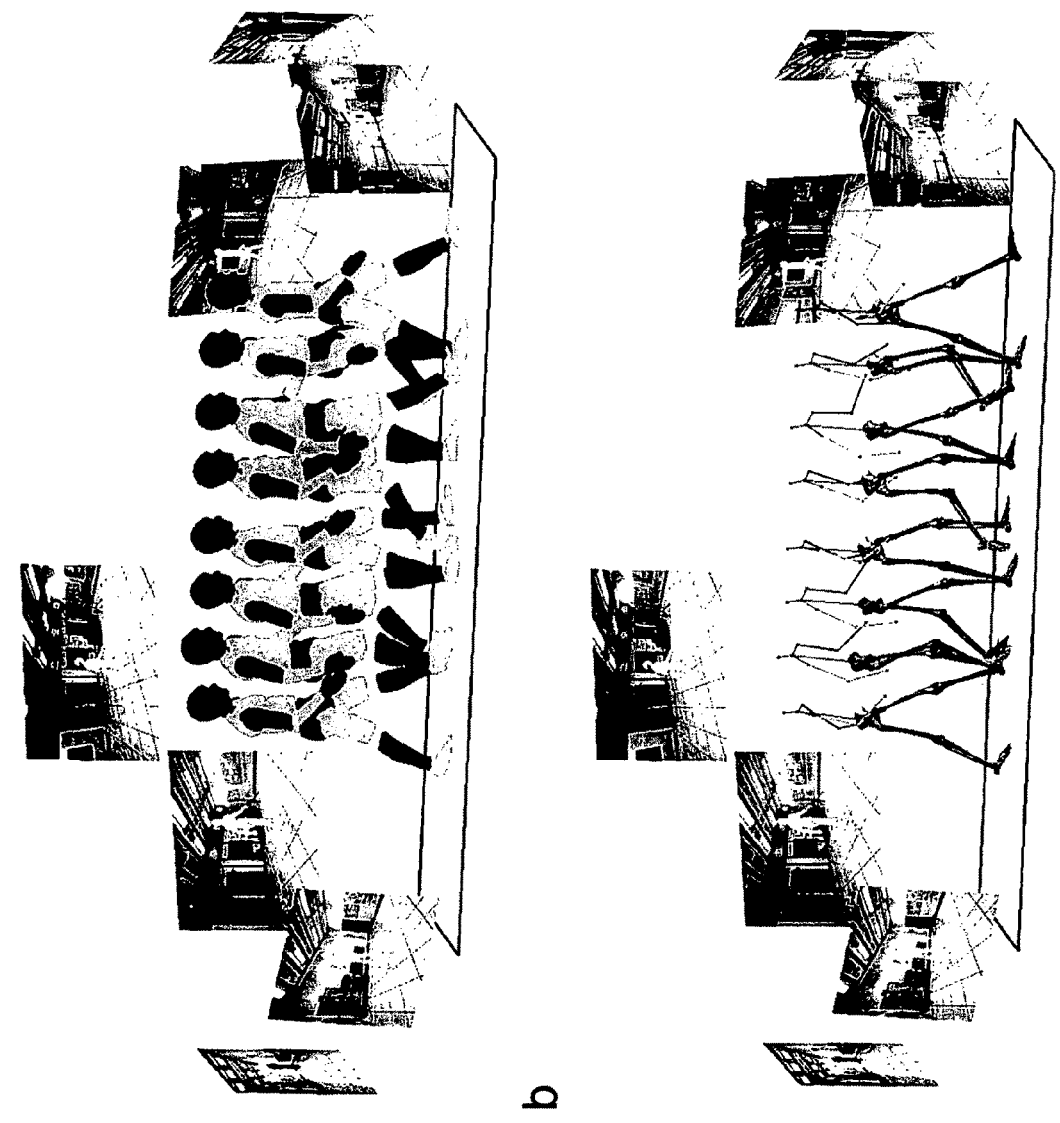
FIG. 4 shows according to the present invention the articulated full-body model R matched to visual hulls (mesh C): (a) body segments, and (b) skeletal model with joint center locations.
Figure 5:
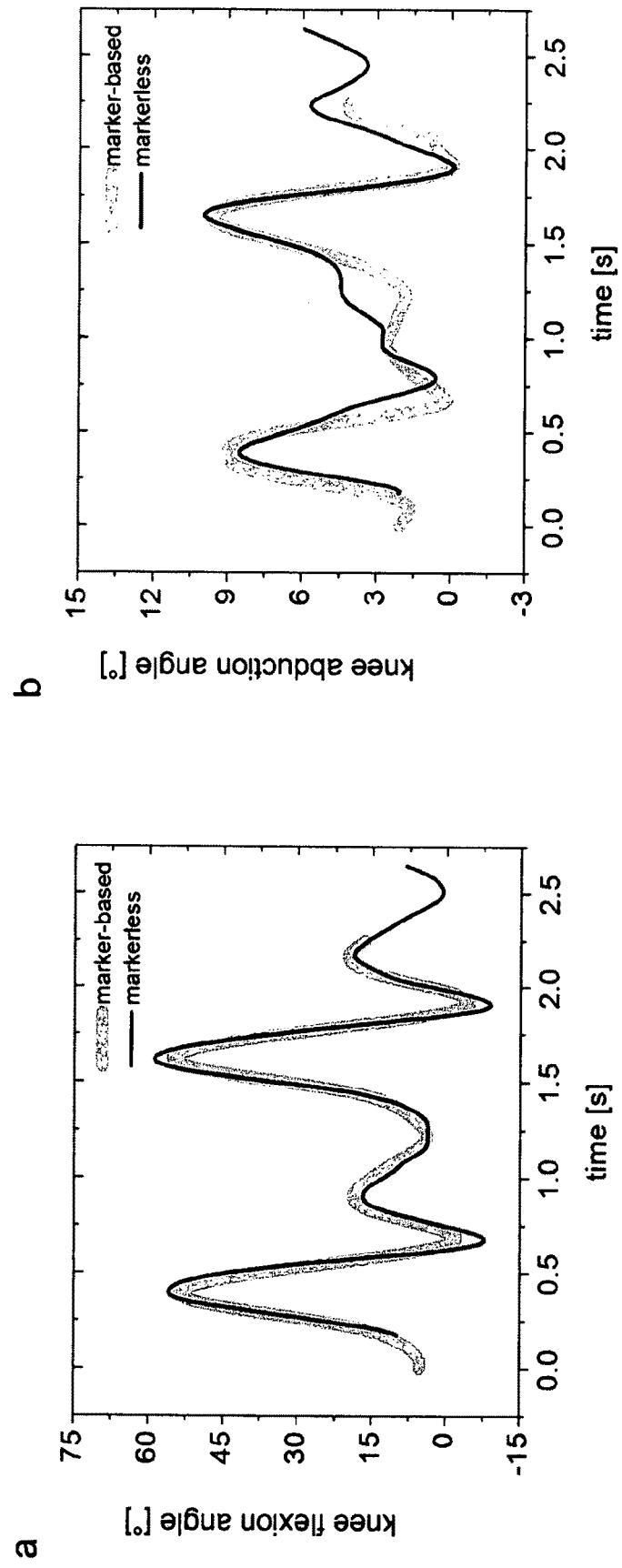
FIG. 5 shows according to the present invention motion graphs for (a) knee flexion and (b) knee abduction angles. (gray=marker-based; black=markerless).

The model R was roughly matched to the first frame in the motion sequence and subsequently tracked automatically over the gait cycle (see FIG. 4). The initial matching can be done manually and/or automatically by orienting model R based on a motion trajectory of all meshes C and positioning model R based on the center of mass of mesh C. Joint center locations were extracted for all joints and joint centers of adjacent segments were used to define segment coordinate axes. Joint angles for the lower limbs for the sagittal and frontal planes were calculated as angles between corresponding axes of neighboring segments projected into the corresponding planes. Accuracy of human body kinematics was calculated as the average deviation of the deviation of joint angles derived from visual hulls compared to joint angles derived from the theoretical sequence and marker-based system over the gait cycle, respectively. The joint angles (sagittal and frontal plane) for the knee calculated as angles between corresponding axes of neighboring segments are used as preliminary basis of comparison between the marker-based and markerless systems (see FIG. 5). The accuracy of sagittal and frontal plane knee joint angles calculated from experiments was within the scope of the accuracy estimated from the theoretical calculations (accuracy$_{experimental}$: 2.3±1.0° (sagittal); 1.6±0.9° (frontal); accuracy$_{theoretical}$: 2.1±0.9° (sagittal); 0.4±0.7° (frontal)).

Initialization

The initialization of the first frame in the sequence could also be established through an alternate ad-hoc approach using stochastic optimization. The stochastic method for tracking and initialization implements a variation of simulated annealing method, for the first time applied to markerless motion capture. The key equations are the acceptance functions (Equations 3 and 4) and the cost function (Equation 5). The acceptance functions are a function of the parameter T and of the value of the cost function $f$. The parameter T, commonly called temperature due to the analogy of the optimization process with the chemical process of annealing, is a function that decreases as the iteration number increases.

$$A(x, y, T) = \min\left\{1, e^{\frac{f_y - f_x}{T}}\right\} \quad (3)$$

$$x_{i+1} = \begin{cases} y_{i+1} = x_i + k_{i+1} & \text{if } p \leq A(x_i, y_{i+1}, T_i) \\ x_i & \text{otherwise} \end{cases} \quad (4)$$

Moving from current state $x_i$ to next state $x_{i+1}$, the step is accepted or not depending on (Equation 4) where p is sampled from a uniform distribution [0,1] and the value $k_{i+1}$ is a state sampled from a chosen distribution. The formulation implemented samples $k_{i+1}$ from a Cauchy distribution. Sampling in this way allows the algorithm to visit each region with positive Lebesgue measure infinitely often when a cooling schedule proportional to $T_0/i$ is adopted, where $T_0$ is a large enough constant and i is the number of iterations. To assure better capabilities for climbing up local minima (see FIG. 6), in the invention the parameter T is not decreased linearly with respect to the number of iterations but depends also on the value of the cost function. In one possible embodiment of the invention the cost function implemented in the algorithm is a variation on the Hausdorff distance and has been shown to be very robust even if computationally demanding.

$$\text{COST}(A, B) = \sum_{\forall a \in A} \min_{\forall b \in B}\{\|a - b\|\} \quad (5)$$

Figure 6:
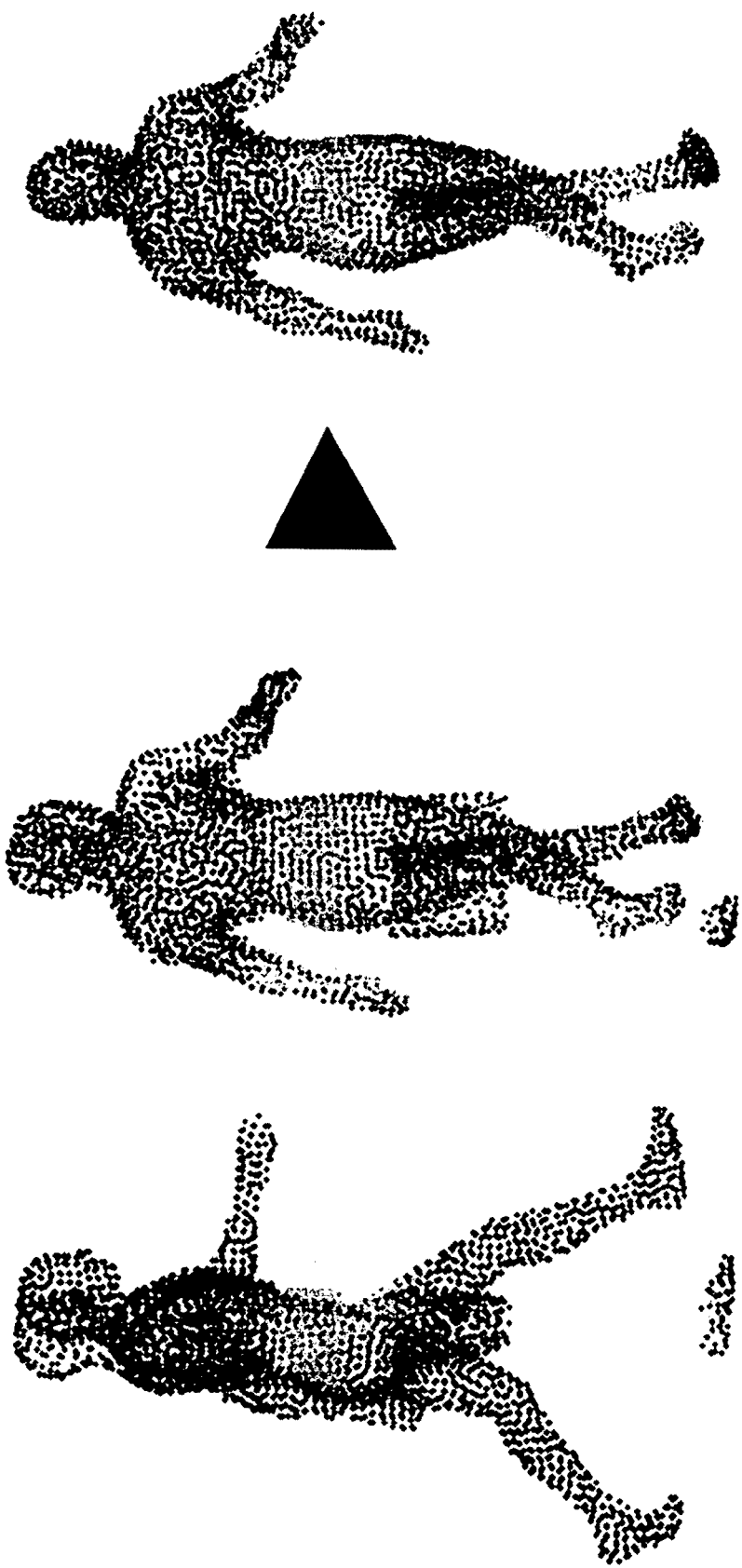
FIG. 6 shows according to the present invention the process of matching the first frame. The mesh C as a visual hull point cloud is shown in blue, while the different segments of the model R are shown in other colors. The algorithm does not require an accurate initialization of the model to achieve the first matching, which is shown off to the right in the figure.

As a result, unlike other tracking algorithms, the presented method does not require accurate initialization of the model to match the first frame. A rough rigid body positioning (FIG. 6, left) of the model in a reference frame is enough to have a consistent matching of the first frame of the sequence (FIG. 6, right). The rough body positioning can be achieved simply by aligning the center of mass of the models and the three principal components of the inertia tensor.

Body Segments and Coordinate Systems

Figure 7:
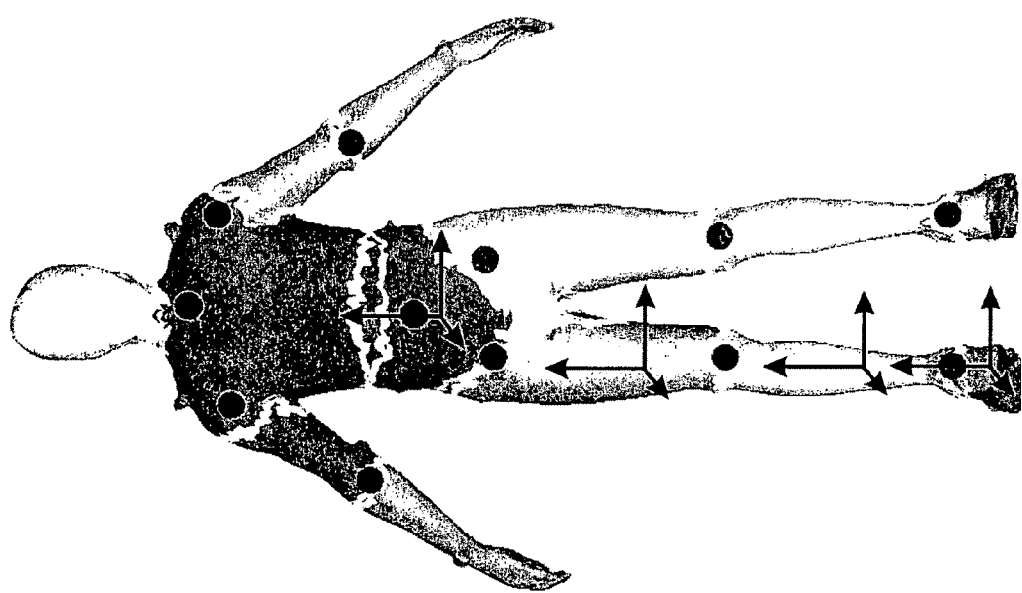
FIG. 7 shows according to the present invention selected coordinate systems associated with body segments of model R.

The invention provides a 3D coordinate system for every anatomical segment described in the model (FIG. 7). This allows a more complete and meaningful description of the human motion with respect to previous link models. Having a complete coordinate system defined for the parent and child segment of a joint allows a proper description of the joint angles with respect to the three anatomical axes, i.e. antero-posterior, medio-lateral and longitudinal. This formulation also allows i) to specify articular motion constraints and ii) to bound them to anatomically consistent configurations.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example, the embodiment described herein in detail refers to a three-dimensional polygon mesh C as model C. In other embodiments of the invention, model C could be defined as a three-dimensional points cloud, a set of silhouettes and/or features characterizing the human body moving within the viewing volume. Furthermore, the invention can also be applied in the following ways: i) biofeedback applications, for example by visualizing the output on a screen that the subject can see; ii) user interface to control peripherals, for example by connecting the output to a computer with control software; iii) interactive 3D full-body game, for example by applying the technology to a 3D virtual environment. All such variations are considered to be within the scope and spirit of the present invention as defined by the following claims and their legal equivalents.

What is claimed is:

1. A method of generating a three-dimensional dynamic model of a single subject moving within a volume, comprising:
    (a) defining a static full-body model R of said single subject, wherein said model R is a three-dimensional articulated multi-segment model defined by polygon meshes for the body segments, wherein said articulation is defined by three-dimensional joint centers with soft joint constraints between the neighboring body segments in said articulated multi-segment model providing up to 6 degrees of freedom (DOF) in articulation at each joint;
    (b) markerless motion capturing, with a multiple camera system, a three-dimensional representation of said single subject moving within said volume;
    (c) defining for each of said markerless-motion-captured frames a three-dimensional full-body model C of said single subject;
    (d) matching said full-body model C of each of said markerless-motion-captured frames with said full-body model R, wherein said matching allows for deviations between the neighboring body segment using soft joint constraints; and
    (e) outputting for each of said markerless-motion-captured frames a full-body three-dimensional model of said single subject for the movement within said volume, wherein said full-body three-dimensional model is a three-dimensional articulated multi-segment model with three-dimensional soft-joint constraints providing up to 6 DOF in articulation at each joint.

2. The method as set forth in claim 1, wherein said model C is a three-dimensional polygon mesh, a three-dimensional points cloud, a set of silhouettes or features characterizing the human body moving within said viewing volume.

3. The method as set forth in claim 1, wherein the deviation in said soft joint constraints varies from at least 0.1 mm or more.

4. The method as set forth in claim 1, wherein said matching further comprises initializing the first frame of said matching using a stochastic optimization method.

5. The method as set forth in claim 1, wherein said matching further comprises initializing the first frame of said matching using a gradient descent method.

6. The method as set forth in claim 1, wherein said matching further comprises initializing the first frame of said matching using alignment of said model C and said model R based on the body segment orientations and centers of mass.

7. The method as set forth in claim 1, wherein said matching further comprises initializing the first frame of said matching using the model R and model C inertia tensors.

8. The method as set forth in claim 1, wherein said matching is based on evolutions of an iterative process of iterative closet point (ICP) or simulated annealing (SA) methods.

9. The method as set forth in claim 1, wherein said three-dimensional full-body model R and model C are defined by a homogenous distribution of points of the respective meshes.

10. The method as set forth in claim 1, wherein each body segment of said model R has it own three-dimensional local reference frame.

11. The method as set forth in claim 1, wherein each body segment of said model R has a global three-dimensional reference frame with said volume or said environment.

12. The method as set forth in claim 1, wherein each body segment of said model R has it own three-dimensional local reference frame, and wherein each of said local reference frames defined on said matched full-body model R are used to provide up to 6 DOF in articulation at each joint.

13. A computer-readable non-transitory storage medium containing a set of instructions executable on a computer, said set of instructions comprising:
    (a) a reference model definition routine for defining a static full-body model R of said single subject, wherein said model R is a three-dimensional articulated multi-segment model defined by polygon meshes for the body segments, wherein said articulation is defined by three-dimensional joint centers with soft joint constraints between the neighboring body segments in said articulated multi-segment model providing up to 6 degrees of freedom (DOF) in articulation at each joint;
    (b) a markerless motion capture routine for markerless motion capturing, with a multiple camera system, a three-dimensional representation of said single subject moving within said volume;
    (c) a definition routine for defining for each of said markerless-motion-captured frames a three-dimensional full-body model C of said single subject;
    (d) a matching routine for matching said full-body model C of each of said markerless-motion-captured frames with said full-body model R, wherein said matching allows for deviations between the neighboring body segment using soft joint constraints; and
    (e) an output routine for outputting for each of said markerless-motion-captured frames a full-body three-dimensional model of said single subject for the movement within said volume, wherein said full-body three-dimensional model is a three-dimensional articulated multi-segment model with three-dimensional soft-joint constraints providing up to 6 DOF in articulation at each joint.

14. The computer-readable non-transitory storage medium as set forth in claim 13, wherein said model C is a three-dimensional polygon mesh, a three-dimensional points cloud, a set of silhouettes or features characterizing the human body moving within said viewing volume.

15. The computer-readable non-transitory storage medium as set forth in claim 13, wherein the deviation in said soft joint constraints varies from at least 0.1 mm or more.

16. The computer-readable non-transitory storage medium as set forth in claim 13, wherein said matching further comprises initializing the first frame of said matching using a stochastic optimization method.

17. The computer-readable non-transitory storage medium as set forth in claim 13, wherein said matching further comprises initializing the first frame of said matching using a gradient descent method.

18. The computer-readable non-transitory storage medium as set forth in claim 13, wherein said matching further comprises initializing the first frame of said matching using alignment of said model C and said model R based on the body segment orientations and centers of mass.

19. The computer-readable non-transitory storage medium as set forth in claim 13, wherein said matching further comprises initializing the first frame of said matching using the model R and model C inertia tensors.

20. The computer-readable non-transitory storage medium as set forth in claim 13, wherein said matching is based on evolutions of an iterative process of iterative closet point (ICP) or simulated annealing (SA) methods.

21. The computer-readable non-transitory storage medium as set forth in claim 13, wherein said three-dimensional full-body model R and model C are defined by a homogenous distribution of points of the respective meshes.

22. The computer-readable non-transitory storage medium as set forth in claim 13, wherein each body segment of said model R has it own three-dimensional local reference frame.

23. The computer-readable non-transitory storage medium as set forth in claim 13, wherein each body segment of said model R has a global three-dimensional reference frame with said volume or said environment.

24. The computer-readable non-transitory storage medium as set forth in claim 13, wherein each body segment of said model R has it own three-dimensional local reference frame, and wherein each of said local reference frames defined on said matched full-body model R are used to provide up to 6 DOF in articulation at each joint.

* * * * *